US012619193B2

(12) United States Patent
Itabashi

(10) Patent No.: US 12,619,193 B2
(45) Date of Patent: May 5, 2026

(54) DRUM CARTRIDGE INCLUDING MOVABLE HOLDER HAVING HOLDER TERMINAL, AND RELAY ELECTRODE ELECTRICALLY CONNECTABLE TO HOLDER TERMINAL AND MEMORY OF DEVELOPING CARTRIDGE ATTACHED TO DRUM FRAME

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/008,806

(22) Filed: Jan. 3, 2025

(65) Prior Publication Data

US 2025/0244714 A1 Jul. 31, 2025

(30) Foreign Application Priority Data

Jan. 31, 2024 (JP) ................................ 2024-013267

(51) Int. Cl.
*G03G 21/18* (2006.01)
*G03G 15/00* (2006.01)
(Continued)

(52) U.S. Cl.
CPC ..... *G03G 21/1871* (2013.01); *G03G 15/0863* (2013.01); *G03G 15/80* (2013.01); *G03G 21/1652* (2013.01); *G03G 21/1814* (2013.01); *G03G 21/1817* (2013.01); *G03G 21/1867* (2013.01); *G03G 21/1885* (2013.01);
(Continued)

(58) Field of Classification Search
CPC ........... G03G 15/0863; G03G 15/0896; G03G 15/75; G03G 15/80; G03G 21/1652; G03G 21/1676; G03G 21/1814; G03G 21/1817; G03G 21/1821; G03G 21/1867;
(Continued)

(56) References Cited

U.S. PATENT DOCUMENTS 11,188,008 B2 * 11/2021 Kusuda .............. G03G 21/1885
2019/0391529 A1 12/2019 Abe et al.
(Continued)

FOREIGN PATENT DOCUMENTS

JP 2018-146829 A 9/2018
JP 2021-162751 A 10/2021
JP 2023-3446 A 1/2023

*Primary Examiner* — Sophia S Chen
(74) *Attorney, Agent, or Firm* — Merchant & Gould P.C.

(57) ABSTRACT

A drum cartridge includes a drum frame, a photosensitive drum rotatable about a drum axis extending in a first direction, a drum electrical contact surface, a relay electrode, and a holder holding the drum electrical contact surface. A developing cartridge including a developing roller and a memory is attachable to the drum frame. The drum electrical contact surface is positioned at one end portion of the drum frame in the first direction. The relay electrode is electrically connected to the memory in a state where the developing cartridge is attached to the drum frame. The holder is positioned at the one end portion of the drum frame in the first direction and is movable relative to the drum frame. The holder has a holder terminal electrically connected to the drum electrical contact surface and electrically connectable to the relay electrode.

12 Claims, 8 Drawing Sheets

(51) Int. Cl.
*G03G 15/08* (2006.01)
*G03G 21/16* (2006.01)

(52) U.S. Cl.
CPC ............... *G03G 2221/1823* (2013.01); *G03G 2221/1869* (2013.01)

(58) Field of Classification Search
CPC ........... G03G 21/1871; G03G 21/1885; G03G 2221/166; G03G 2221/1823; G03G 2221/1869
See application file for complete search history.

(56) References Cited

U.S. PATENT DOCUMENTS

| | | | | |
|---|---|---|---|---|
| 2020/0073286 | A1* | 3/2020 | Takeuchi | G03G 15/0863 |
| 2021/0311412 | A1 | 10/2021 | Kusuda et al. | |
| 2021/0397124 | A1* | 12/2021 | Itabashi | G03G 15/80 |
| 2022/0283537 | A1 | 9/2022 | Fukamachi et al. | |
| 2024/0103431 | A1 | 3/2024 | Fukamachi et al. | |
| 2024/0111239 | A1* | 4/2024 | Fukamachi | G03G 21/1867 |

* cited by examiner

DRUM CARTRIDGE INCLUDING MOVABLE HOLDER HAVING HOLDER TERMINAL, AND RELAY ELECTRODE ELECTRICALLY CONNECTABLE TO HOLDER TERMINAL AND MEMORY OF DEVELOPING CARTRIDGE ATTACHED TO DRUM FRAME

REFERENCE TO RELATED APPLICATIONS

This application claims priority from Japanese Patent Application No. 2024-013267 filed on Jan. 31, 2024. The entire content of the priority application is incorporated herein by reference.

BACKGROUND ART

An electrophotographic type image-forming apparatus such as a laser printer and an LED printer has been well known in the art. A prior art discloses a conventional image-forming apparatus including a developing cartridge and a drum cartridge. The developing cartridge is attachable to the drum cartridge. Further, the drum cartridge to which the developing cartridge has been attached is configured to be attached to a housing of the image-forming apparatus.

SUMMARY

The above-mentioned developing cartridge includes a memory. The memory is held by a holder which is movably supported to a casing of the developing cartridge. Upon attachment of the drum cartridge having the developing cartridge attached thereto to the housing of the image-forming apparatus, an electrical contact surface of the memory held by the holder contacts an electrode provided at the housing. Hence, a controller of the image-forming apparatus can communicate with the memory.

However, in the above-described conventional structure, the holder is required in the developing cartridge. Hence, the number of parts constituting the developing cartridge is increased.

In view of the foregoing, it is an object of the present disclosure to provide a technique according to which the number of parts required for a developing cartridge can be reduced.

In order to attain the above and other objects, according to one aspect, the present disclosure provides a drum cartridge including a drum frame, a photosensitive drum, a drum electrical contact surface, a relay electrode, and a holder. A developing cartridge is attachable to the drum frame. The developing cartridge includes: a developing roller rotatable about a developing axis extending in a first direction; and a memory storing information about the developing cartridge. The photosensitive drum is rotatable about a drum axis extending in the first direction. The drum electrical contact surface is positioned at one end portion of the drum frame in the first direction. The relay electrode is configured to be electrically connected to the memory in a state where the developing cartridge is attached to the drum frame. The holder is positioned at the one end portion of the drum frame in the first direction and is movable relative to the drum frame. The holder holds the drum electrical contact surface and has a holder terminal electrically connected to the drum electrical contact surface. The holder terminal is electrically connectable to the relay electrode.

The drum cartridge described above includes the drum electrical contact surface, the holder, and the relay electrode. Upon attachment of the developing cartridge to the drum cartridge, the memory of the developing cartridge is electrically connected to the drum electrical contact surface through the relay electrode. Further, the holder is movable relative to the drum frame. With this structure, the developing cartridge is not required to have an electrical contact surface held by a holder. Accordingly, the number of parts and components of the developing cartridge can be made smaller.

DESCRIPTION

Figure 1:
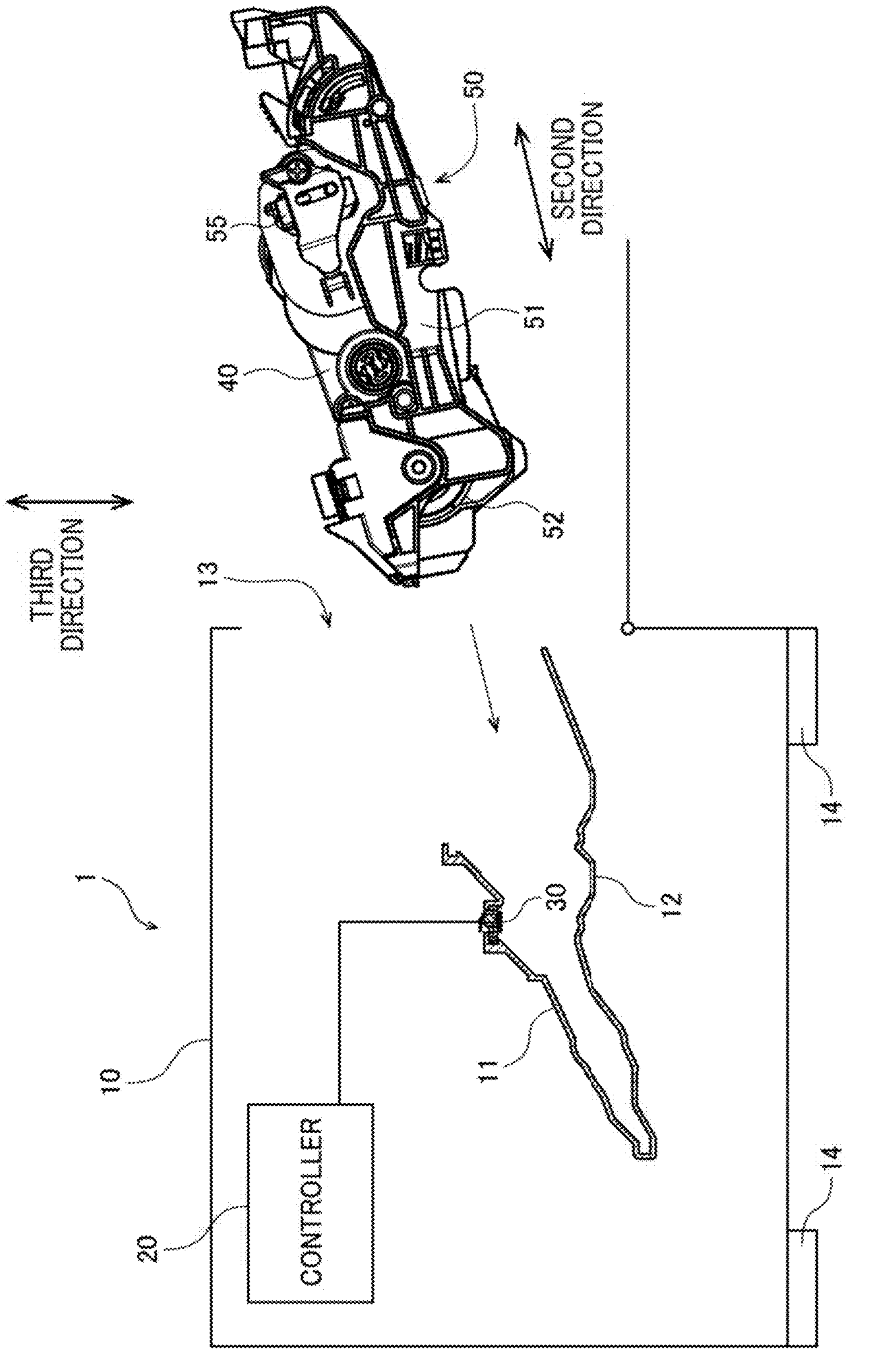
FIG. 1 is a schematic view illustrating a structure of an image-forming apparatus.

Hereinafter, an embodiment of the present disclosure will be described with reference to FIGS. 1 through 8.

Incidentally, in the following description, a direction in which of a drum axis A2 (FIG. 2) of a photosensitive drum 52 (FIG. 1) extends will be referred to as "first direction." A direction in which a first relay terminal 61 (FIG. 5) moves relative to a drum frame 51 (FIG. 2) will be referred to as "second direction." Further, a direction crossing drum electrical contact surfaces 56 (FIG. 5) will be referred to as "third direction".

The first direction and the second direction cross each other. Preferably, the first direction and the second direction be perpendicular to each other. The first direction and the third direction cross each other. Preferably, the first direction and the third direction be perpendicular to each other. The second direction and the third direction cross each other.

1. Outline of Image-Forming Apparatus

FIG. 1 is a schematic view of an image-forming apparatus 1. The image-forming apparatus 1 is an electrophotographic-type printer. For example, the image-forming apparatus 1 may be a laser printer or an LED printer. As illustrated in FIG. 1, the image-forming apparatus 1 includes a housing 10, a controller 20, a device electrode 30, a developing cartridge 40, and a drum cartridge 50.

The developing cartridge 40 is attachable to and detachable from the drum cartridge 50. Further, the drum cartridge 50 to which the developing cartridge 40 has been attached is detachably attachable to the housing 10.

As illustrated in FIG. 1, the housing 10 has an insertion opening 13. The drum cartridge 50 to which the developing cartridge 40 has been attached is inserted into the housing 10 in the second direction through the insertion opening 13. As a result, the drum cartridge 50 to which the developing cartridge 40 has been attached is attached to the housing 10. In the image-forming apparatus 1, an image is formed on a sheet with toner supplied from the developing cartridge 40.

The housing 10 includes a first guide frame 11 and a second guide frame 12. The first guide frame 11 and the second guide frame 12 are configured to guide a holder 55 (described later) of the drum cartridge 50 in a process of attaching the drum cartridge 50 to which the developing cartridge 40 has been attached to the housing 10.

The first guide frame 11 and the second guide frame 12 each extend in the second direction. Further, the first guide frame 11 and the second guide frame 12 are spaced apart from each other in the third direction. A distance in the third direction between the first guide frame 11 and the second guide frame 12 gradually becomes smaller as the first guide frame 11 and the second guide frame 12 extend away from the insertion opening 13 in the second direction.

The device electrode 30 is provided on the first guide frame 11. In a state where the drum cartridge 50 to which the developing cartridge 40 has been attached is attached to the housing 10, the device electrode 30 contacts the drum electrical contact surface 56 (described later) of the drum cartridge 50. The device electrode 30 is electrically connected to the controller 20. The controller 20 is an integrated circuit board for controlling operations of various parts or units in the image-forming apparatus 1. The controller 20 includes a processor and a memory (not illustrated).

Further, the image-forming apparatus 1 includes a plurality of legs 14 (only two of the legs 14 are shown in FIG. 1). The housing 10 is supported by the legs 14. The legs 14 are aligned in a direction crossing the second direction. That is, the second direction is slanted relative to the direction in which the legs 14 are arranged.

2. Developing Cartridge

Figure 2:
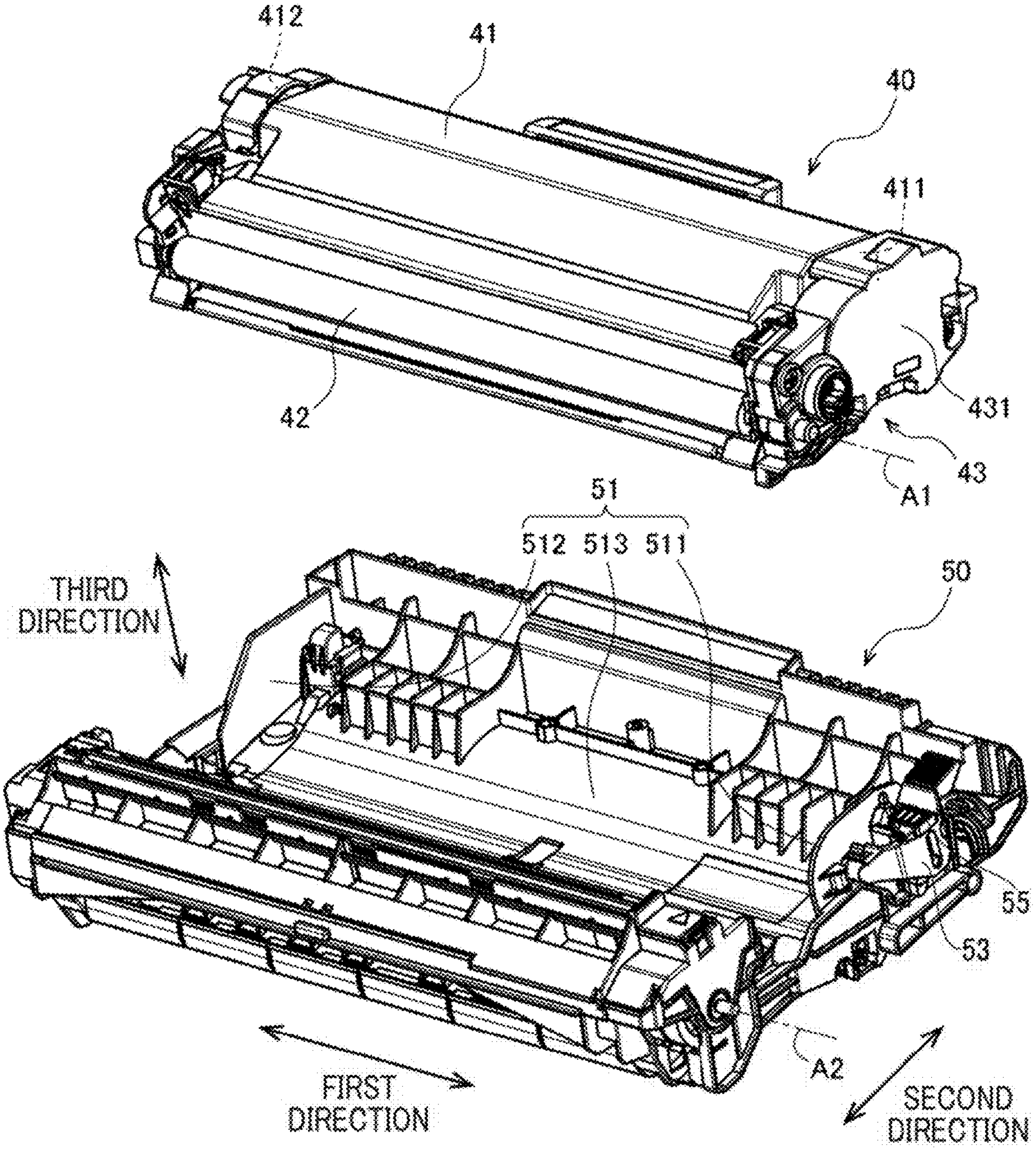
FIG. 2 is a perspective view of a developing cartridge and a drum cartridge.

FIG. 2 is a perspective view of the developing cartridge 40 and the drum cartridge 50. As illustrated in FIG. 2, the developing cartridge 40 includes a developing frame 41, a developing roller 42, and a gear portion 43.

The developing frame 41 is a container in which toner is stored as a developing agent. The developing frame 41 has a first outer surface 411 and a second outer surface 412. The first outer surface 411 is one end of the developing frame 41 in the first direction. The second outer surface 412 is an other end of the developing frame 41 in the first direction. The first outer surface 411 and the second outer surface 412 are apart from each other in the first direction.

The developing roller 42 is rotatable about a developing axis A1 extending in the first direction. The developing roller 42 is supported by the developing frame 41. The developing roller 42 is positioned at one end portion of the developing frame 41 in the second direction. The toner stored in the developing frame 41 is configured to be supplied to an outer peripheral surface of the developing roller 42 through a supply roller (not illustrated). The toner is thus carried on the outer peripheral surface of the developing roller 42.

The gear portion 43 is positioned at the first outer surface 411 of the developing frame 41. The gear portion 43 includes a plurality of gears and a gear cover 431. The gear cover 431 is fixed to the first outer surface 411 of the developing frame 41. At least a part of the plurality of gears is positioned in between the first outer surface 411 and the gear cover 431 in the first direction. In the state where the drum cartridge 50 is attached to the housing 10 with the developing cartridge 40 attached to the drum cartridge 50, a driving force is configured to be transmitted to the developing roller 42, from a drive source (not illustrated) in the housing 10, through the plurality of gears of the gear portion 43, thereby rotating the developing roller 42 about the developing axis A1.

Figure 3:
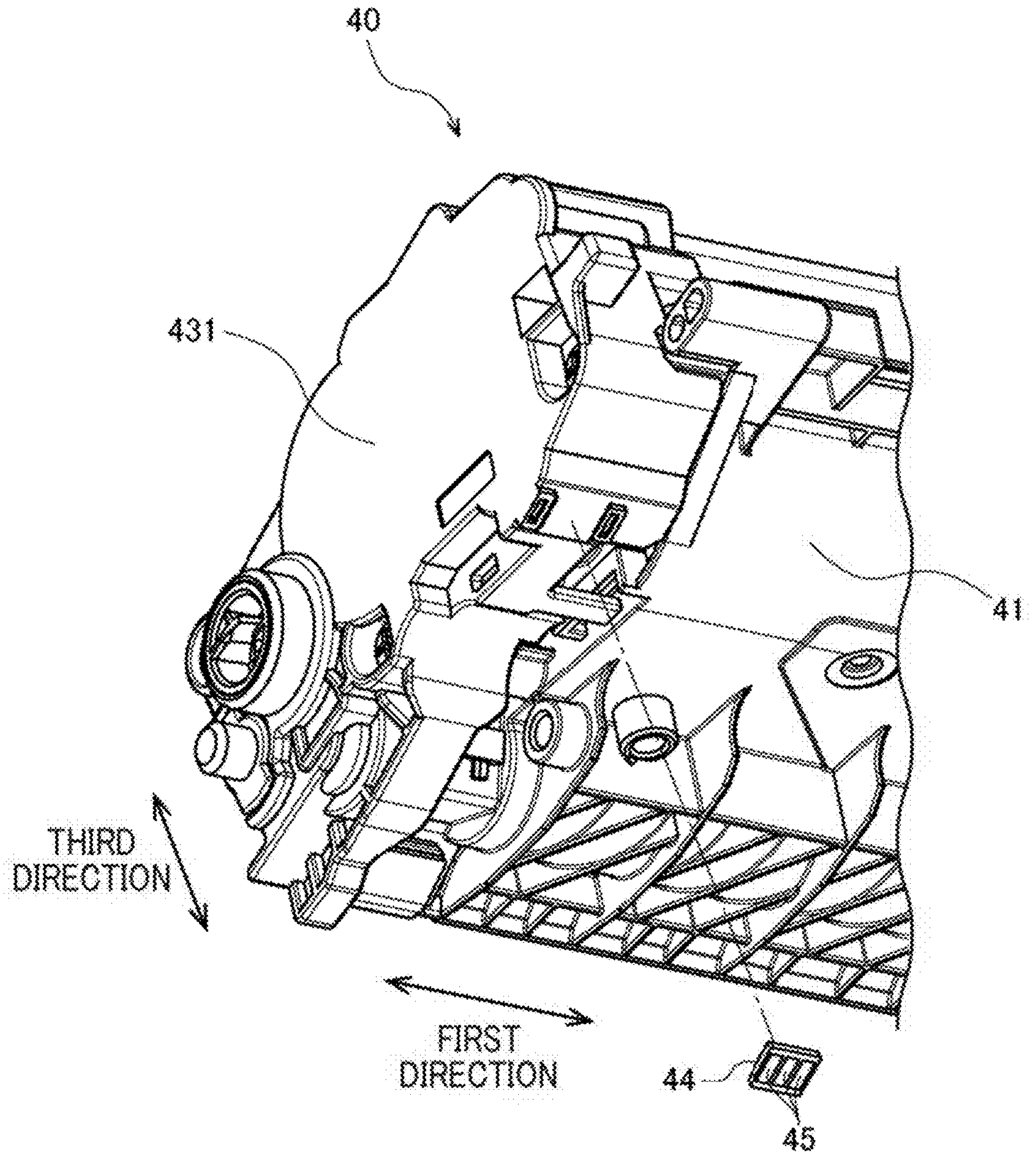
FIG. 3 is a partial and exploded perspective view of the developing cartridge.

FIG. 3 is a partially-enlarged exploded perspective view of the developing cartridge 40. As illustrated in FIG. 3, the developing cartridge 40 further includes a memory 44.

The memory 44 is a storage medium storing information about the developing cartridge 40. The memory 44 is positioned at the first outer surface 411 of the developing frame 41. Specifically, the memory 44 is positioned on an outer surface of the gear cover 431. More specifically, in a state where the developing cartridge 40 is attached to the drum cartridge 50, the memory 44 is arranged, on the outer surface of the gear cover 431, at such a position that the memory 44 faces the drum frame 51 (described later) of the drum cartridge 50 in the third direction.

The memory 44 is an IC chip, for example. The memory 44 stores at least one of identification information and lifetime information. Here, the identification information represents information for distinction of each developing cartridge 40, and specifically, a production number of the developing cartridge 40. The lifetime information is indicative of the lifetime of the developing cartridge 40, and specifically, a cumulative number of rotations of the developing roller 42.

Developing electrical contact surfaces 45 are provided on a surface of the memory 44. The developing electrical contact surfaces 45 are electrically conductive surfaces made from metal. The developing electrical contact surfaces 45 are electrically connected to the memory 44. Each developing electrical contact surface 45 extends to cross the third direction. The developing electrical contact surfaces 45 face the drum frame 51 in the state where the developing cartridge 40 is attached to the drum cartridge 50.

Incidentally, in the present embodiment, the developing electrical contact surfaces 45 are provided on the surface of the memory 44. However, the memory 44 may be arranged separately at a different position from the developing electrical contact surfaces 45. For example, the memory 44 may be attached to the outer surface of the developing frame 41. In this case, the memory 44 and the developing electrical contact surfaces 45 may be electrically connected to each other through conductive wires.

3. Drum Cartridge

The drum cartridge 50 will be described next.

As illustrated in FIGS. 1 and 2, the drum cartridge 50 includes the drum frame 51 and the photosensitive drum 52.

The drum frame 51 includes a first side frame 511, a second side frame 512, and a connection frame 513. The first side frame 511 is one end of the drum frame 51 in the first direction. The second side frame 512 is an other end of the drum frame 51 in the first direction. The first side frame 511 and the second side frame 512 are spaced apart from each other in the first direction.

The first side frame 511 extends along a surface crossing the first direction. That is, the first side frame 511 extends in both the second direction and the third direction. The second side frame 512 extends along a surface crossing the first direction. That is, the second side frame 512 extends in both the second direction and the third direction. The connection frame 513 connects the first side frame 511 and the second side frame 512 to each other in the first direction.

The developing cartridge 40 is attachable to the drum frame 51. In a state where the developing cartridge 40 is attached to the drum frame 51, the developing cartridge 40 is positioned between the first side frame 511 and the second side frame 512 in the first direction.

The photosensitive drum 52 is rotatable about the drum axis A2 extending in the first direction. The photosensitive drum 52 is supported by the drum frame 51. The photosensitive drum 52 is positioned between the first side frame 511 and the second side frame 512 in the first direction. Further, the photosensitive drum 52 is positioned at an end portion of the drum frame 51 in the second direction.

The photosensitive drum 52 has a cylindrical-shaped outer peripheral surface covered with a photosensitive material. In a state where the drum cartridge 50 is attached to the housing 10, the photosensitive drum 52 receives the driving force from the drive source (not illustrated) provided in the housing 10.

In the state where the developing cartridge 40 is attached to the drum frame 51, the developing roller 42 and the photosensitive drum 52 are positioned side by side in the second direction. Specifically, the outer peripheral surface of the developing roller 42 and the outer peripheral surface of the photosensitive drum 52 are in contact with each other in the state where the developing cartridge 40 is attached to the drum frame 51.

The toner is configured to be supplied from the outer peripheral surface of the developing roller 42 to the outer peripheral surface of the photosensitive drum 52. At this time, the toner is transferred from the developing roller 42 to the photosensitive drum 52 according to an electrostatic latent image formed on the outer peripheral surface of the photosensitive drum 52, so that a toner image corresponding to the electrostatic latent image is formed on the outer peripheral surface of the photosensitive drum 52.

Figure 4:
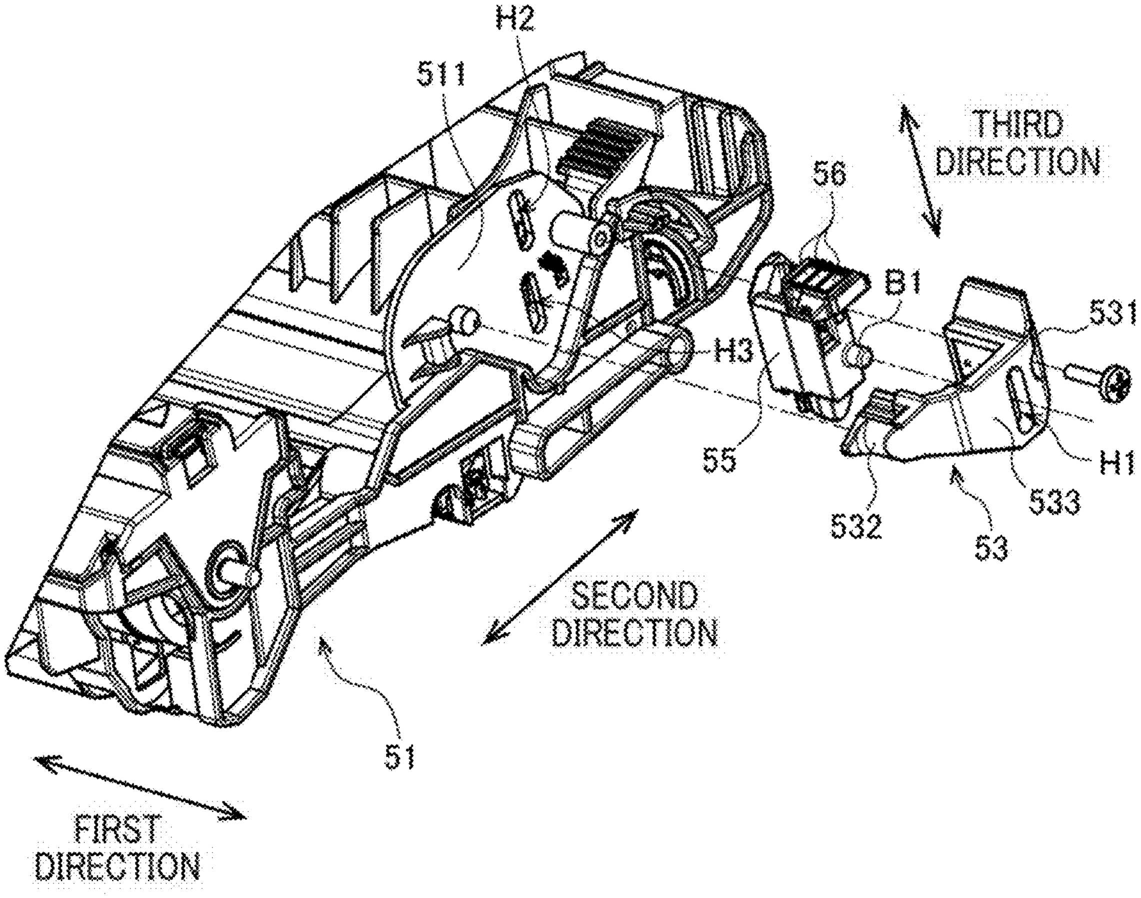
FIG. 4 is a partial and exploded perspective view of the drum cartridge.
Figure 5:
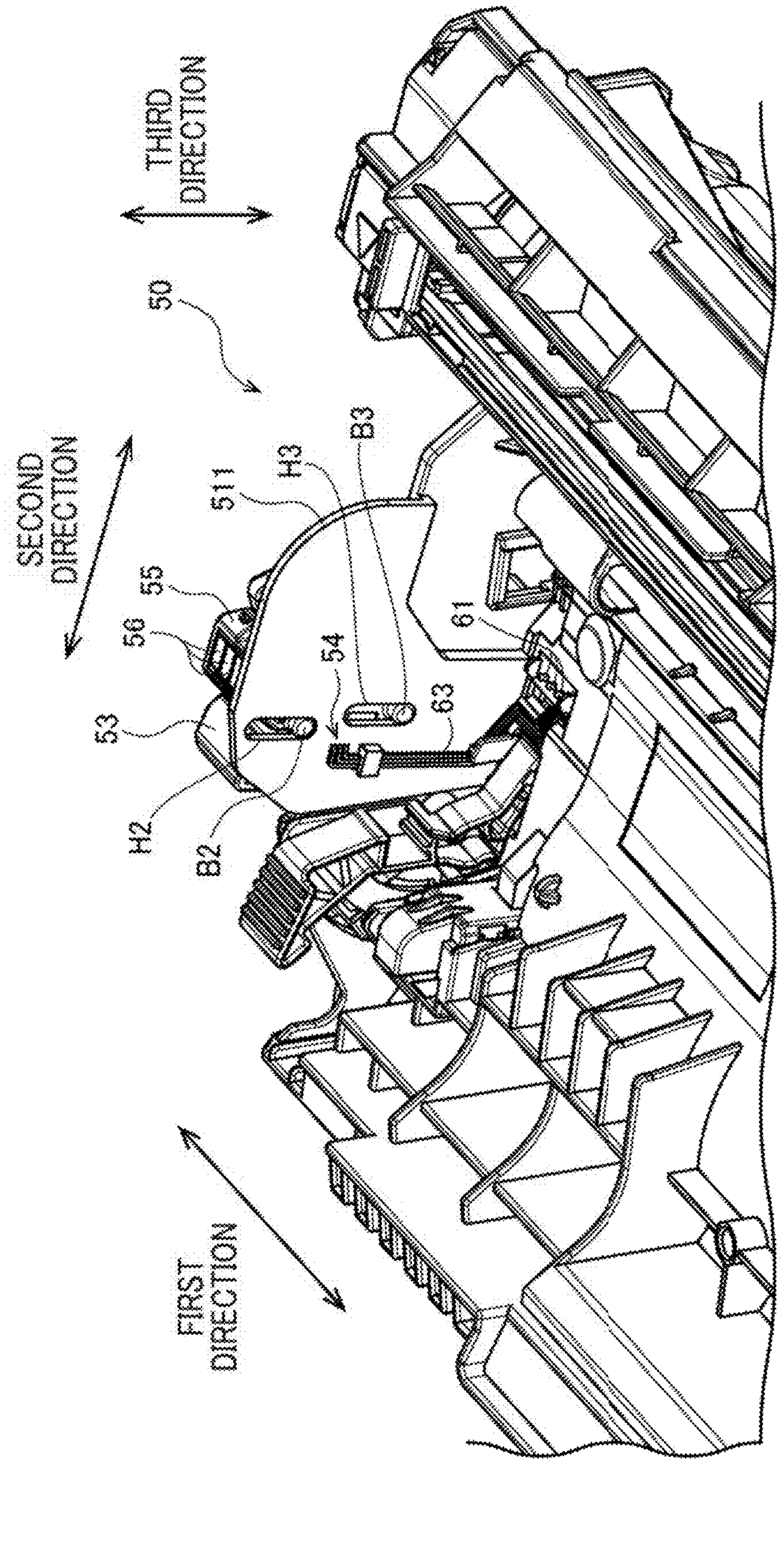
FIG. 5 is a partial perspective view of the drum cartridge.

FIG. 4 is a partial exploded perspective view of the drum cartridge 50. FIG. 5 is a partial perspective view of the drum cartridge 50. As illustrated in FIGS. 4 and 5, the drum cartridge 50 includes a holder cover 53, a relay electrode 54, the holder 55, and the drum electrical contact surfaces 56.

The holder cover 53, the relay electrode 54, the holder 55, and the drum electrical contact surfaces 56 are configured to electrically connect the memory 44 of the developing cartridge 40 to the device electrode 30 in the state where the drum cartridge 50 with the developing cartridge 40 attached thereto is attached to the housing 10. The holder cover 53, the relay electrode 54, the holder 55, and the drum electrical contact surfaces 56 are positioned at one end portion of the drum frame 51 in the first direction.

Figure 6:
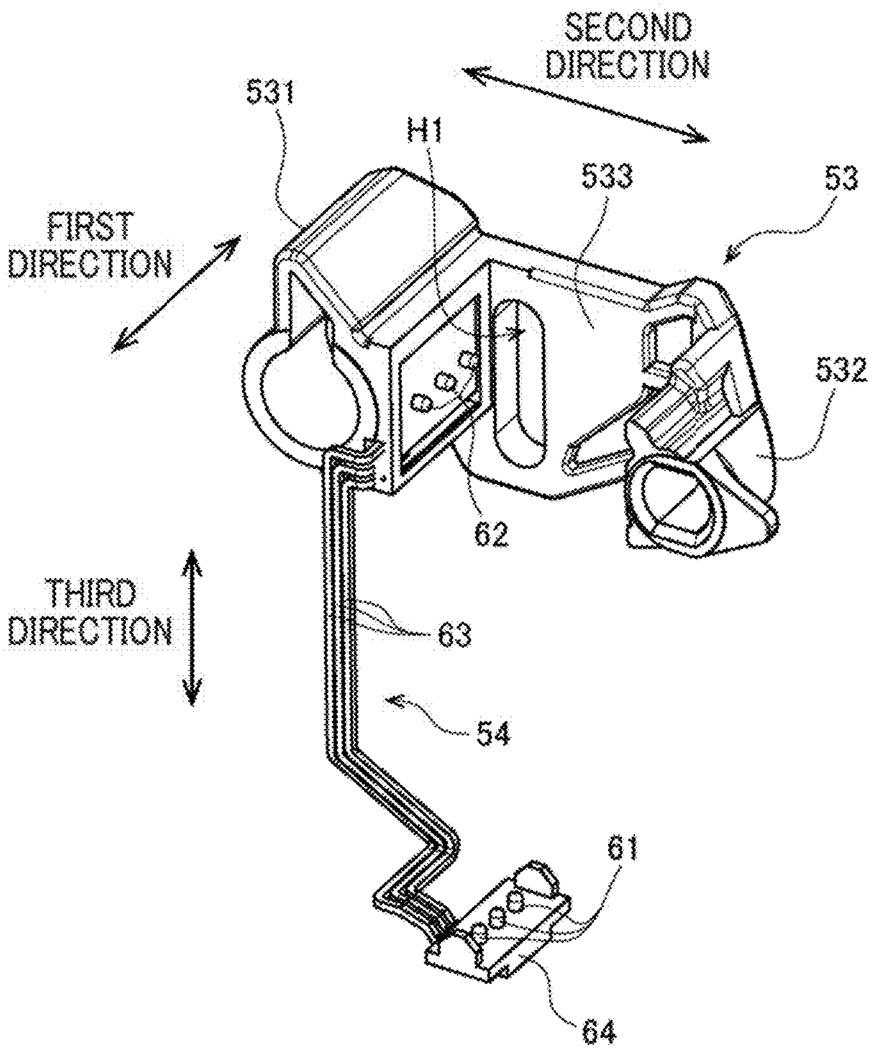
FIG. 6 is a perspective view of a holder cover and a relay electrode of the drum cartridge.

FIG. 6 is a perspective view illustrating the holder cover 53 and the relay electrode 54. The holder cover 53 not only supports the relay electrode 54, but also covers the holder 55. The holder cover 53 is made from resin as an electrical insulator. The holder cover 53 includes a first end part 531 and a second end part 532. The first end part 531 is one end of the holder cover 53 in the second direction. The second end part 532 is an other end of the holder cover 53 in the second direction. The first end part 531 and the second end part 532 are fixed to the outer surface of the first side frame 511.

The holder cover 53 further includes a covering part 533. The covering part 533 connects the first end part 531 and the second end part 532 to each other in the second direction. The covering part 533 is positioned outward of and spaced away from the first side frame 511 in the first direction.

The relay electrode 54 is formed of metal as an electrical conductor. As illustrated in FIG. 6, the relay electrode 54 includes the first relay terminals 61, the second relay terminals 62, and the conducting wires 63.

The first relay terminals 61 are positioned on the surface of the drum frame 51. The first relay terminals 61 are positioned inward of the first side frame 511 in the first direction. That is, the first relay terminals 61 are positioned opposite the holder cover 53 with respect to the first side frame 511 in the first direction.

The drum cartridge 50 includes a plate 64 that holds the first relay terminals 61. The plate 64 is attached to the drum frame 51. The plate 64 extends in a direction crossing the third direction. That is, the plate 64 extends in both the first direction and the second direction. The first relay terminals 61 protrude in the third direction from the plate 64.

In the state where the developing cartridge 40 is attached to the drum frame 51, the first relay terminals 61 contact the respective developing electrical contact surfaces 45 so that the first relay terminals 61 and the developing electrical contact surfaces 45 are electrically connected to each other. As a result, the relay electrode 54 and the memory 44 are electrically connected to each other.

Figure 7:
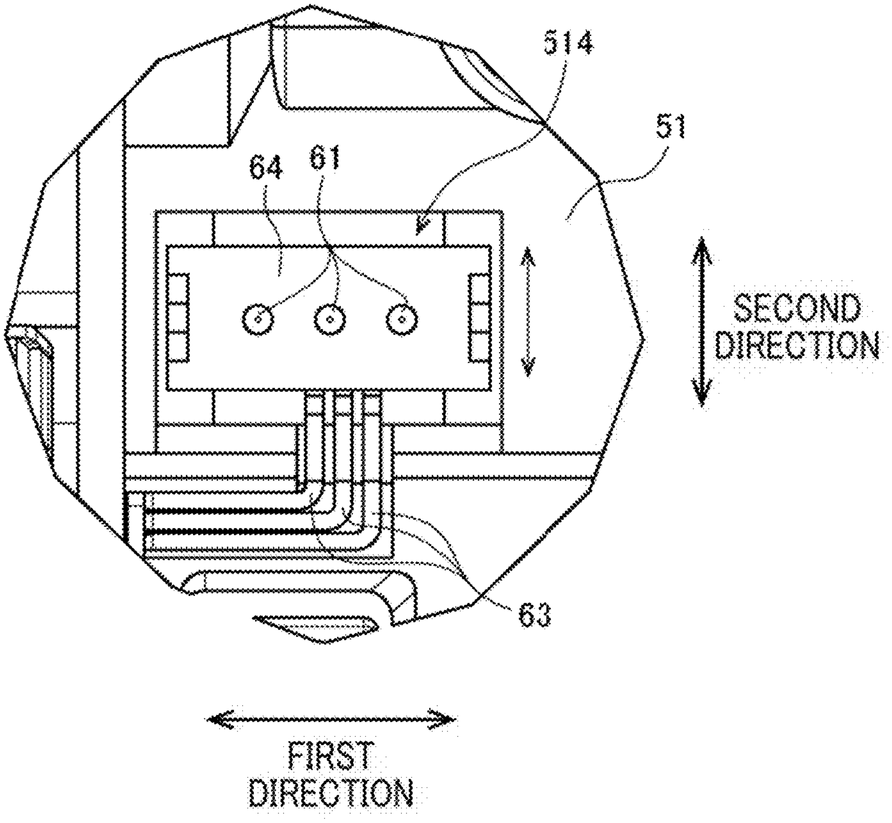
FIG. 7 is a plan view of a first relay terminal and a plate of the drum cartridge.

FIG. 7 is a plan view of the first relay terminals 61 and the plate 64. As illustrated in FIG. 7, the drum frame 51 has a guide groove 514 extending in the second direction. The plate 64 is positioned in the guide groove 514. The plate 64 is movable relative to the drum frame 51 in the second direction along the guide groove 514. Hence, the first relay terminals 61 are also movable, relative to the drum frame 51, in the second direction together with the plate 64.

The second relay terminals 62 are attached to the holder cover 53. Specifically, the second relay terminals 62 are attached to the first end part 531 of the holder cover 53. The second relay terminals 62 protrude in the second direction from a region of the outer surface of the first end part 531, the region facing the second end part 532.

The conducting wires 63 connect the first relay terminals 61 to the corresponding second relay terminals 62. The first relay terminals 61 and he second relay terminals 62 are electrically connected to each other through the conducting wires 63. In the present embodiment, three first relay terminals 61 and three second relay terminal 62 are provided, respectively, and hence, three conducting wires 63 are provided. Each conducting wire 63 electrically connects one of the first relay terminals 61 to a corresponding one of the second relay terminals 62. The three conducting wires 63 are bundled together by an insulation tube to constitute a wire harness.

The holder 55 holds the drum electrical contact surfaces 56. The holder 55 is positioned at the outer surface of the first side frame 511. Specifically, the holder 55 is positioned between the first side frame 511 and the covering part 533 in the first direction.

Figure 8:
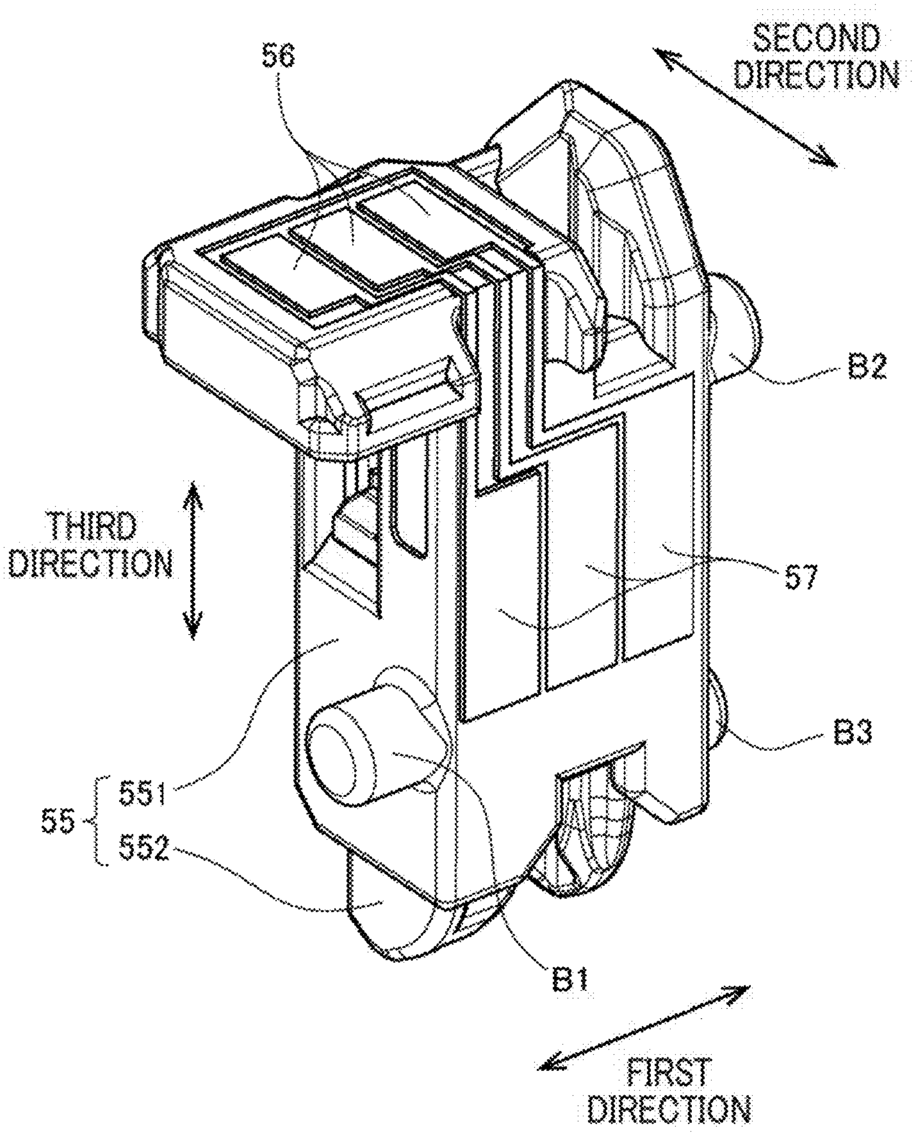
FIG. 8 is a perspective view of a holder and a drum electrical contact surface of the drum cartridge.

FIG. 8 is a perspective view of the holder 55 and the drum electrical contact surfaces 56. As illustrated in FIG. 8, the holder 55 includes a first holder member 551 and a second holder member 552. The first holder member 551 is movable relative to the second holder member 552 in the third direction. The first holder member 551 and the second holder member 552 are made of resin as an electrical insulator. The holder 55 further includes a spring (not illustrated). The spring is interposed between the first holder member 551 and the second holder member 552. The spring is configured to expand and compress in the third direction. Hence, the holder 55 is configured to expand and compress in the third direction together with the spring.

The holder 55 further includes a first boss B1, a second boss B2, and a third boss B3. The first boss B1 protrudes from the first holder member 551 in the first direction toward the covering part 533. The second boss B2 and the third boss B3 protrude from the first holder member 551 in the first direction toward the first side frame 511.

On the other hand, as illustrated in FIGS. 4 and 6, the holder cover 53 has a first slot H1. The first slot H1 penetrates the covering part 533 in the first direction. The first boss B1 of the holder 55 (first holder member 551) is inserted in the first slot H1. Further, as illustrated in FIG. 4, the first side frame 511 has a second slot H2 and a third slot H3. The second slot H2 and the third slot H3 penetrate the first side frame 511 in the first direction. The second boss B2 of the holder 55 (first holder member 551) is inserted in the second slot H2, and the third boss B3 of the holder 55 (first holder member 551) is inserted in the third slot H3.

The first slot H1 has a length in the third direction that is greater than a length in the third direction of the first boss B1. Hence, the first boss B1 is movable in the third direction within the first slot H1. The second slot H2 has a length in the third direction that is greater than a length in the third direction of the second boss B2. Hence, the second boss B2 is movable in the third direction within the second slot H2. The third slot H3 has a length in the third direction that is greater than a length in the third direction of the third boss B3. Hence, the third boss B3 is movable in the third direction within the third slot H3.

Hence, the holder 55 is movable in the third direction relative to the drum frame 51 and the holder cover 53. A distance by which the holder 55 is movable relative to the drum frame 51 in the third direction is greater than a distance by which the first relay terminal 61 is movable relative to the drum frame 51 in the second direction.

As illustrated in FIG. 8, the holder 55 also includes holder terminals 57. The holder terminals 57 are made of an electrically conductive material such as metal. The holder terminals 57 are positioned on an outer surface of the first holder member 551 to face the first end part 531 of the holder cover 53 in the second direction. The holder terminals 57 are in contact with the respective second relay terminals 62, so that the holder terminals 57 and the respective second relay terminals 62 are electrically connected to each other.

Incidentally, the holder terminals 57 and the corresponding second relay terminals 62 need not always be in contact with each other. For example, the holder terminals 57 may be configured to be electrically connected to the corresponding second relay terminals 62 while the holder 55 is moving relative to the drum frame 51. That is, the holder 55 may be movable relative to the holder cover 53 in the second direction. In this case, the holder 55 may be configured to move toward the second relay terminals 62 to bring the holder terminals 57 into contact with the corresponding second relay terminals 62 in the process for attaching the drum frame 51 to the housing 10.

The drum electrical contact surfaces 56 are positioned at one end portion of the holder 55 in the third direction. Specifically, the drum electrical contact surfaces 56 are positioned at one end portion of the first holder member 551 in the third direction. The drum electrical contact surfaces 56 extend to cross the third direction. The drum electrical contact surfaces 56 are made of an electrically conductive material such as metal. The drum electrical contact surfaces 56 and the respective holder terminals 57 are electrically connected to each other. The drum electrical contact surfaces 56 and the holder terminals 57 are both fixed to the first holder member 551. Hence, both the drum electrical contact surfaces 56 and the holder terminals 57 move in the third direction relative to the drum frame 51 as the holder 55 moves in the third direction relative to the drum frame 51.

In the process of attaching the drum frame 51 (to which the developing cartridge 40 has been attached) to the housing 10, the holder 55 moves together with the drum frame 51 in the second direction. In this process, the holder 55 is guided by the first guide frame 11 and the second guide frame 12. Specifically, the first holder member 551 is guided by the first guide frame 11, and the second holder member 552 is guided by the second guide frame 12. Accordingly, the holder 55 is fixed in position in the third direction.

Upon completion of the attachment of the drum cartridge 50 (to which the developing cartridge 40 is attached) to the housing 10, the drum electrical contact surfaces 56 contact the device electrode 30. In this state, the spring interposed between the first holder member 551 and the second holder member 552 is compressed in the third direction into a length smaller than its natural length. Hence, the drum electrical contact surfaces 56 are urged toward the device electrode 30 by a resilient force of the spring, thereby providing a stabilized contact of the drum electrical contact surfaces 56 with the device electrode 30.

The memory 44 of the developing cartridge 40 is electrically connected to the controller 20 through the developing electrical contact surfaces 45, the first relay terminals 61, the conducting wires 63, the second relay terminals 62, the holder terminals 57, the drum electrical contact surfaces 56, and the device electrode 30. With this structure, the controller 20 can electrically communicate with the memory 44. That is, the controller 20 can read information from the memory 44, and/or write information into the memory 44.

As described above, the drum cartridge 50 includes the relay electrode 54, the holder 55, and the drum electrical contact surfaces 56. The memory 44 of the developing cartridge 40 is electrically connected to the drum electrical contact surfaces 56 through the relay electrode 54 upon attachment of the developing cartridge 40 to the drum cartridge 50. Further, the holder 55 is movable relative to the drum frame 51. Upon attachment of the drum cartridge 50 to the housing 10 with the developing cartridge 40 attached to the drum cartridge 50, the drum electrical contact surfaces 56 held by the holder 55 are connected to the device electrode 30. With this structure, electrical contact surfaces held by a holder are not required in the developing cartridge 40, thereby reducing the number of parts and components of the developing cartridge 40.

Further, the image-forming apparatus 1 can perform a separating operation in the state where the drum cartridge 50 to which the developing cartridge 40 has been attached is attached to the housing 10. The separating operation is performed to temporarily separate the developing roller 42 from the photosensitive drum 52. According to the separating operation, the developing frame 41 is caused to move, relative to the drum frame 51, away from the photosensitive drum 52 in the second direction. At this time, the developing electrical contact surfaces 45 also move away from the photosensitive drum 52, relative to the drum frame 51, in the second direction.

Here, as described above, the first relay terminals 61 are movable together with the plate 64 in the second direction relative to the drum frame 51. Hence, in the separating operation, the first relay terminals 61 are also caused to move in the second direction relative to the drum frame 51 as the developing electrical contact surfaces 45 move relative to the drum frame 51 in the second direction. That is, the developing electrical contact surfaces 45 and the first relay terminals 61 are caused to move together in the second direction while maintaining contact therebetween. Consequently, frictional wearing between the developing electrical contact surfaces 45 and the first relay terminals 61 can be restrained.

4. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the relay electrode 54 need not include all of the first relay terminals 61, the second relay terminals 62, and the conducting wires 63. Alternatively, the relay electrode 54 may be configured such that the first relay terminals 61 are directly connected to the respective holder terminals 57 by the respective conducting wires 63.

In the above-described embodiment, only one drum cartridge 50 to which the developing cartridge 40 has been attached is configured to be attached to the housing 10. However, a plurality of drum cartridges 50 to each of which a corresponding developing cartridge 40 has been attached may be configured to be attached to the single housing 10.

Further, each and every part of the image-forming apparatus 1 may have a shape different from that illustrated in the accompanying drawings. Further, each element appearing in the embodiment and modifications may be suitably selected and combined as long as no technically conflicting problem is incurred.

What is claimed is:

1. A drum cartridge comprising:
a drum frame to which a developing cartridge is attachable, the developing cartridge including: a developing roller rotatable about a developing axis extending in a first direction;
and a memory storing information about the developing cartridge;
a photosensitive drum rotatable about a drum axis extending in the first direction;
a drum electrical contact surface positioned at one end portion of the drum frame in the first direction;
a relay electrode configured to be electrically connected to the memory in a state where the developing cartridge is attached to the drum frame; and
a holder positioned at the one end portion of the drum frame in the first direction and movable relative to the drum frame, the holder holding the drum electrical contact surface and having a holder terminal electrically connected to the drum electrical contact surface, the holder terminal being electrically connectable to the relay electrode.

2. The drum cartridge according to claim 1,
wherein the holder terminal is electrically connected to the relay electrode while the holder is moving relative to the drum frame.

3. The drum cartridge according to claim 1,
wherein the relay electrode is positioned at the one end portion of the drum frame in the first direction.

4. The drum cartridge according to claim 1,
wherein the developing cartridge includes a developing electrical contact surface electrically connected to the memory, and
wherein the relay electrode is electrically connected to the developing electrical contact surface in the state where the developing cartridge is attached to the drum frame.

5. The drum cartridge according to claim 4,
wherein the relay electrode comprises:
a first relay terminal, the first relay terminal being electrically connected to the developing electrical contact surface in the state where the developing cartridge is attached to the drum frame;
a second relay terminal electrically connected to the holder terminal; and
a conducting wire electrically connecting the first relay terminal and the second relay terminal to each other.

6. The drum cartridge according to claim 5,
wherein the first relay terminal is movable relative to the drum frame in a second direction crossing the first direction.

7. The drum cartridge according to claim 6,
wherein the photosensitive drum is aligned with the developing roller in the second direction in the state where the developing cartridge is attached to the drum frame.

8. The drum cartridge according to claim 5,
wherein the first relay terminal is movable relative to the drum frame in a second direction crossing the first direction,
wherein the holder is movable relative to the drum frame in a third direction crossing both the first direction and the second direction, and
wherein a distance by which the holder is movable relative to the drum frame in the third direction is greater than a distance by which the first relay terminal is movable relative to the drum frame in the second direction.

9. The drum cartridge according to claim 1,
wherein the drum electrical contact surface is positioned at one end portion of the holder in a direction crossing the first direction, the drum electrical contact surface extending to cross the direction crossing the first direction.

10. The drum cartridge according to claim 9,
wherein the holder is movable, relative to the drum frame, in the direction crossing the first direction.

11. The drum cartridge according to claim 1,
wherein the drum cartridge is attachable to a housing of an image-forming apparatus, the housing including a device electrode, and
wherein the drum electrical contact surface is in contact with the device electrode in a state where the drum cartridge is attached to the housing.

12. The drum cartridge according to claim 1, further comprising a holder cover fixed to the one end portion of the drum frame in the first direction, the holder cover supporting the holder such that the holder is movable relative to the holder cover in a direction crossing the first direction,
wherein the developing cartridge includes a developing electrical contact surface electrically connected to the memory, and
wherein the relay electrode comprises:
a first relay terminal provided at the one end portion of the drum frame in the first direction, the first relay terminal being electrically connected to the developing electrical contact surface in the state where the developing cartridge is attached to the drum frame;

a second relay terminal provided at the holder cover and electrically connected to the holder terminal; and a conducting wire electrically connecting the first relay terminal and the second relay terminal to each other.

* * * * *